(12) United States Patent
Kudo

(10) Patent No.: US 10,366,717 B1
(45) Date of Patent: Jul. 30, 2019

(54) MAGNETIC DISK DEVICE AND METHOD OF WRITING RRO CORRECTION DATA

(71) Applicants: Kabushiki Kaisha Toshiba, Minato-ku, Tokyo (JP); Toshiba Electronic Devices & Storage Corporation, Minato-ku, Tokyo (JP)

(72) Inventor: Fumiya Kudo, Kamakura Kanagawa (JP)

(73) Assignees: Kabushiki Kaisha Toshiba, Tokyo (JP); Toshiba Electronics Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/128,977

(22) Filed: Sep. 12, 2018

(30) Foreign Application Priority Data

Mar. 19, 2018 (JP) ................. 2018-051545

(51) Int. Cl.
  *G11B 5/56* (2006.01)
  *G11B 5/58* (2006.01)
  *G11B 5/596* (2006.01)
  *G11B 20/10* (2006.01)
  *G11B 19/04* (2006.01)

(52) U.S. Cl.
  CPC ........ *G11B 5/59627* (2013.01); *G11B 19/045* (2013.01); *G11B 20/10009* (2013.01)

(58) Field of Classification Search
  CPC ........... G11B 5/00; G11B 27/36; G11B 20/18; G11B 5/5539; G11B 20/20; G11B 5/54; G11B 5/56; G11B 5/58; G11B 5/59627
  USPC ............ 360/75, 76, 77.01, 77.04, 25, 31, 53
  See application file for complete search history.

(56) References Cited

U.S. PATENT DOCUMENTS

| 6,141,175 | A  | * | 10/2000 | Nazarian | ............ | G11B 5/59688 |
|           |    |   |         |          |              | 360/77.04    |
| 7,595,955 | B2 |   | 9/2009  | Hosono et al. | | |
| 8,737,011 | B1 |   | 5/2014  | Buch et al. | | |
| 9,001,450 | B2 |   | 4/2015  | Coker et al. | | |
| 9,318,146 | B2 |   | 4/2016  | Cho | | |
| 2009/0284859 | A1 | | 11/2009 | Chung et al. | | |

* cited by examiner

*Primary Examiner* — Nabil Z Hindi
(74) *Attorney, Agent, or Firm* — White & Case LLP

(57) ABSTRACT

According to one embodiment a magnetic disk device, includes a disk which includes a plurality of servo sectors radially extending in a radial direction and being discretely disposed with a gap in a circumferential direction, a head which writes data to the disk and reads data from the disk, and a controller which writes a plurality of pieces of correction data with respect to a repeatable run-out of the disk to a plurality of first sectors disposed between the servo sectors in a first region, and writes the pieces of correction data to a plurality of second sectors disposed between the servo sectors in a second region different from the first region.

20 Claims, 9 Drawing Sheets

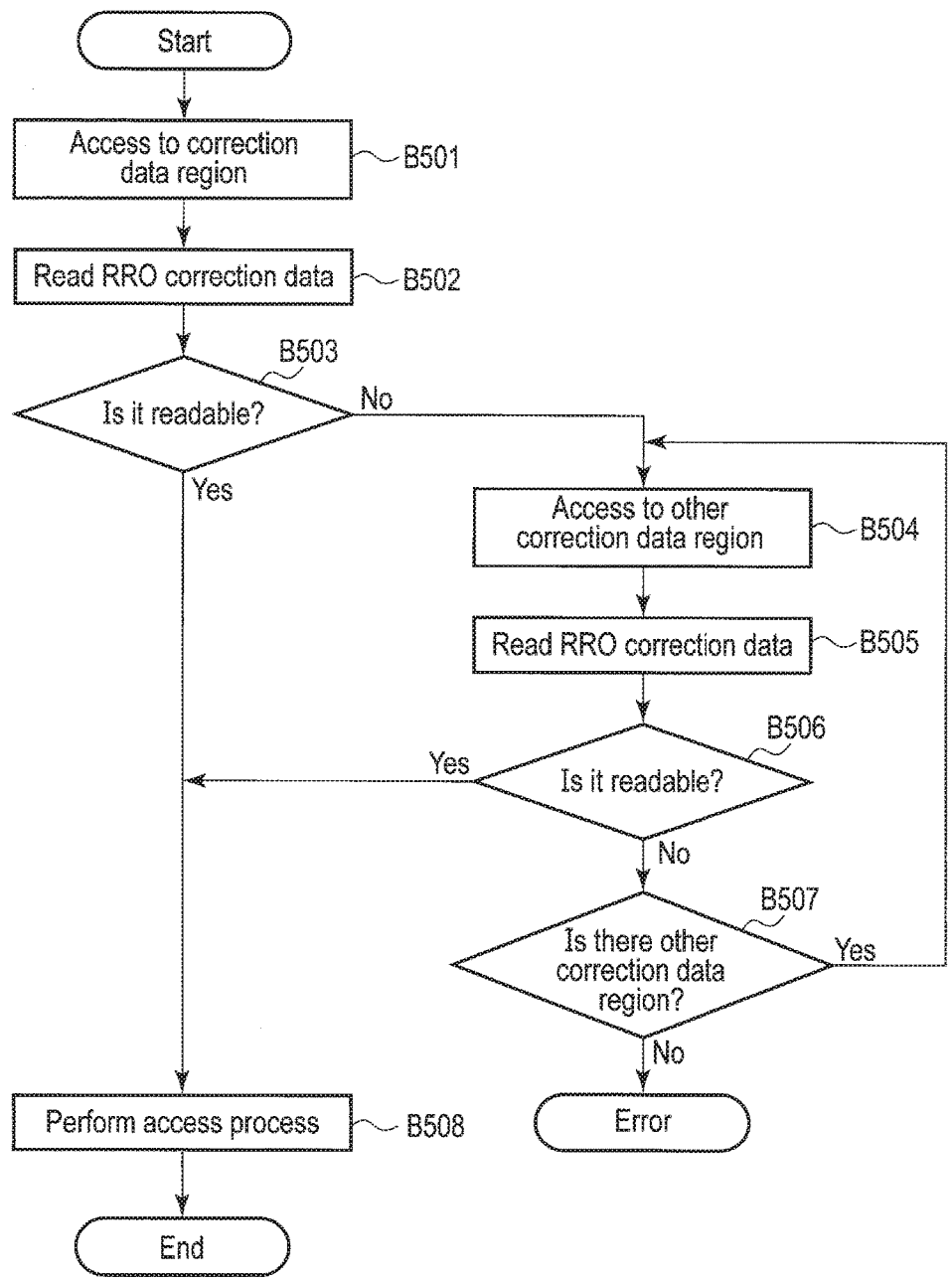
F I G. 5

MAGNETIC DISK DEVICE AND METHOD OF WRITING RRO CORRECTION DATA

CROSS-REFERENCE TO RELATED APPLICATIONS

This application is based upon and claims the benefit of priority from Japanese Patent Application No. 2018-051545, filed Mar. 19, 2018, the entire contents of which are incorporated herein by reference.

FIELD

Embodiments described herein relate generally to a magnetic disk device and a method of writing RRO correction data.

BACKGROUND

In a magnetic disk device, servo data is written to a disk in order to control a location of a magnetic head on a magnetic disk. The servo data contains an error caused by distortion in a track (that is, a repeatable run-out (RRO) which is synchronous to a rotation of the disk). The magnetic disk device acquires RRO correction data (RRObit or Post-Code) to correct the error caused by the RRO, and corrects a position of the head based on the acquired RRO correction data. The RRO correction data is normally written to a servo region (servo sector). Therefore, a preamble corresponding to the RRO correction data is contained in each servo region. In a case where the RRO correction data is written to the disk in the same format as user data, the preamble corresponding to the RRO correction data can be reduced in all the disks.

BRIEF DESCRIPTION OF THE DRAWINGS

FIG. 5 is a flowchart illustrating an example of an access process of the first embodiment;

DETAILED DESCRIPTION

In general, according to one embodiment, a magnetic disk device comprises: a disk which includes a plurality of servo sectors radially extending in a radial direction and being discretely disposed with a gap in a circumferential direction; a head which writes data to the disk and reads data from the disk; and a controller which writes a plurality of pieces of correction data with respect to a repeatable run-out of the disk to a plurality of first sectors disposed between the servo sectors in a first region, and writes the pieces of correction data to a plurality of second sectors disposed between the servo sectors in a second region different from the first region.

According to another embodiment, a magnetic disk device comprises: a disk which includes a plurality of servo sectors radially extending in a radial direction and being discretely disposed with a gap in a circumferential direction, a first region comprising a plurality of pieces of correction data with respect to a repeatable run-out which are written in a plurality of first sectors, each of which is disposed between the servo sectors, and a second region comprising the pieces of correction data which are written in a plurality of second sectors, each of which is disposed between the servo sectors; a head which writes data to the disk and reads data from the disk; and a controller which controls a position of the head based on the pieces of correction data.

According to another embodiment, a method of writing RRO correction data applied to a magnetic disk device, the magnetic disk device comprises a disk which includes a plurality of servo sectors radically extending in a radial direction and being discretely disposed with a gap in a circumferential direction, and a head which writes data to the disk and reads data from the disk, the method comprising: writing a plurality of pieces of correction data with respect to a repeatable run-out of the disk to a plurality of first sectors disposed between the servo sectors in a first region; and writing the pieces of correction data to a plurality of second sectors disposed between the servo sectors in a second region which is different from the first region.

Hereinafter, embodiments will be described with reference to the drawings. Further, the drawings are examples, but do not limit the scope of the invention.

First Embodiment

Figure 1:
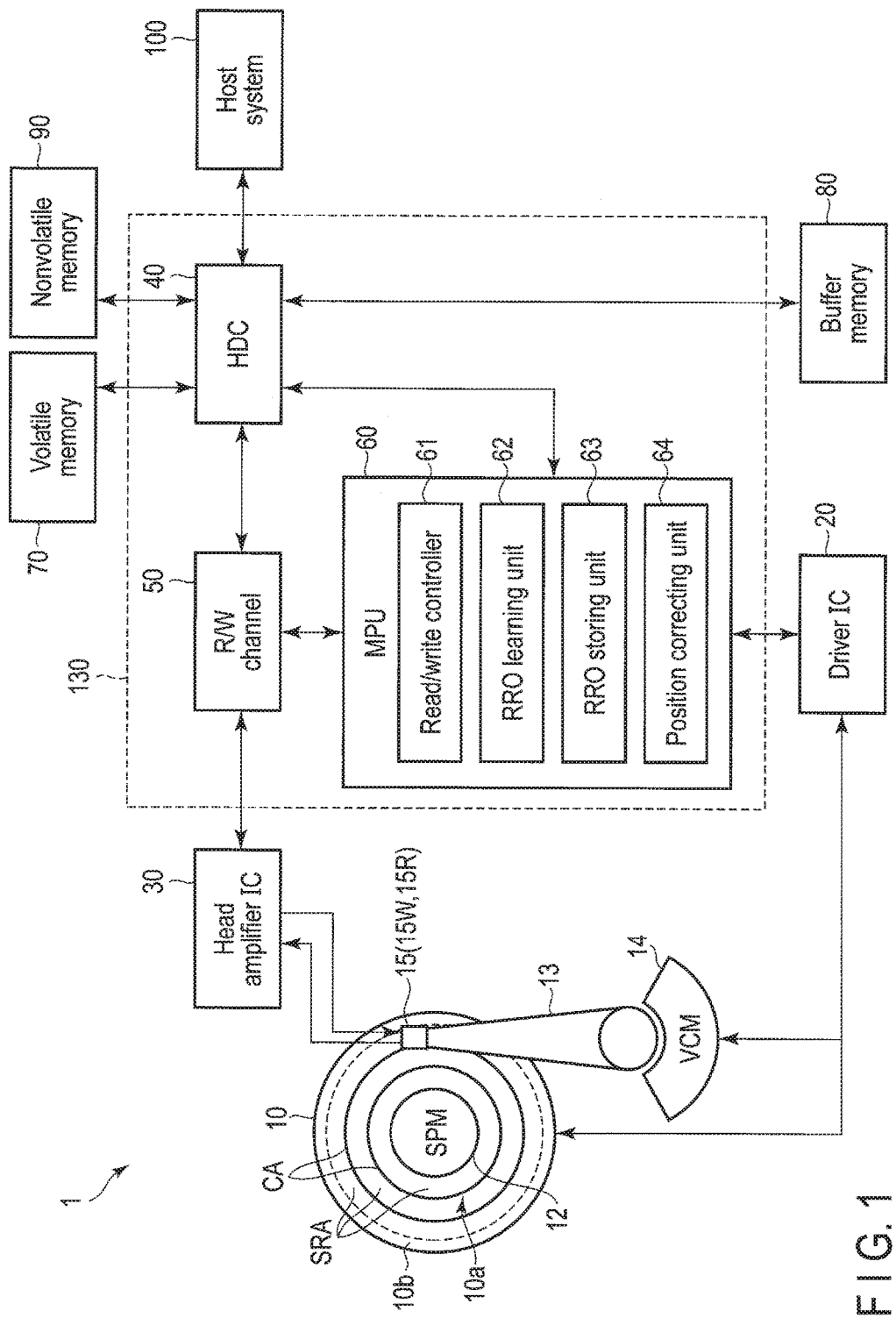
FIG. 1 is a block diagram illustrating a configuration of a magnetic disk device according to a first embodiment.

FIG. 1 is a block diagram illustrating a configuration of a magnetic disk device 1 according to a first embodiment.

The magnetic disk device 1 includes a head disk assembly (HDA) described below, a driver IC 20, a head amplifier integrated circuit (hereinafter, a head amplifier IC or an preamplifier) 30, a volatile memory 70, a buffer memory (buffer) 80, a nonvolatile memory 90, and a system controller 130 which is a one-chip integrated circuit. In addition, the magnetic disk device 1 is connected to a host system (host) 100.

The HDA includes a magnetic disk (hereinafter, disk) 10, a spindle motor (SPM) 12, an arm 13 with a head 15 mounted therein, and a voice coil motor (VCM) 14. The disk 10 is attached to the spindle motor 12, and is driven by the spindle motor 12 and rotates. The arm 13 and the VCM 14 form an actuator. The actuator is driven by the VCM 14 and controls the moving of the head 15 mounted in the arm 13 up to a particular position (hereinafter, simply referred to as a radius position) in a radial direction on the disk 10. The number of disks 10 and heads 15 may be provided by two or more.

The disk 10 is allocated with a user data region 10*a* and a media cache (media cache) region 10*b* in the recording region. The user data region 10*a* includes a shingled magnetic recording (SMR) region SRA and a plurality of correction data regions CA. The shingled magnetic recording region SRA is stored with user data which is requested to be written from the host 100. The shingled magnetic recording region SRA is a region where a currently writing track is overwritten on part of the last written track. With the configuration that a plurality of tracks is overwritten, a track per inch (TPI) of the shingled magnetic recording region SRA becomes larger than the TPI of a normal recording region which is not overwritten. In the shingled magnetic recording region SRA, a track group which includes a plurality of overwritten tracks may be called a band region. The shingled magnetic recording region SRA includes a plurality of band regions. The plurality of correction data regions CA is stored with RRO correction data in the same format as the user data to correct an error caused by distortion in the track (that is, an error caused by a repeatable run-out (RRO) in synchronization with the rotation of the disk). Further, the plurality of correction data regions CA may belong to a part of the shingled magnetic recording region SRA. The media cache region 10*b* may be used as a cache of the user data region 10*a* (the shingled magnetic recording region SRA). Hereinafter, a direction along the circumference of the disk 10 is called a circumferential direction. A direction orthogonal to the circumferential direction is called a radial direction.

The head 15 has a slider as a main body, and includes a write head 15W and a read head 15R which are mounted in the slider. The write head 15W writes data on the disk 10. The read head 15R reads data which is recorded in a data track on the disk 10.

Figure 2:
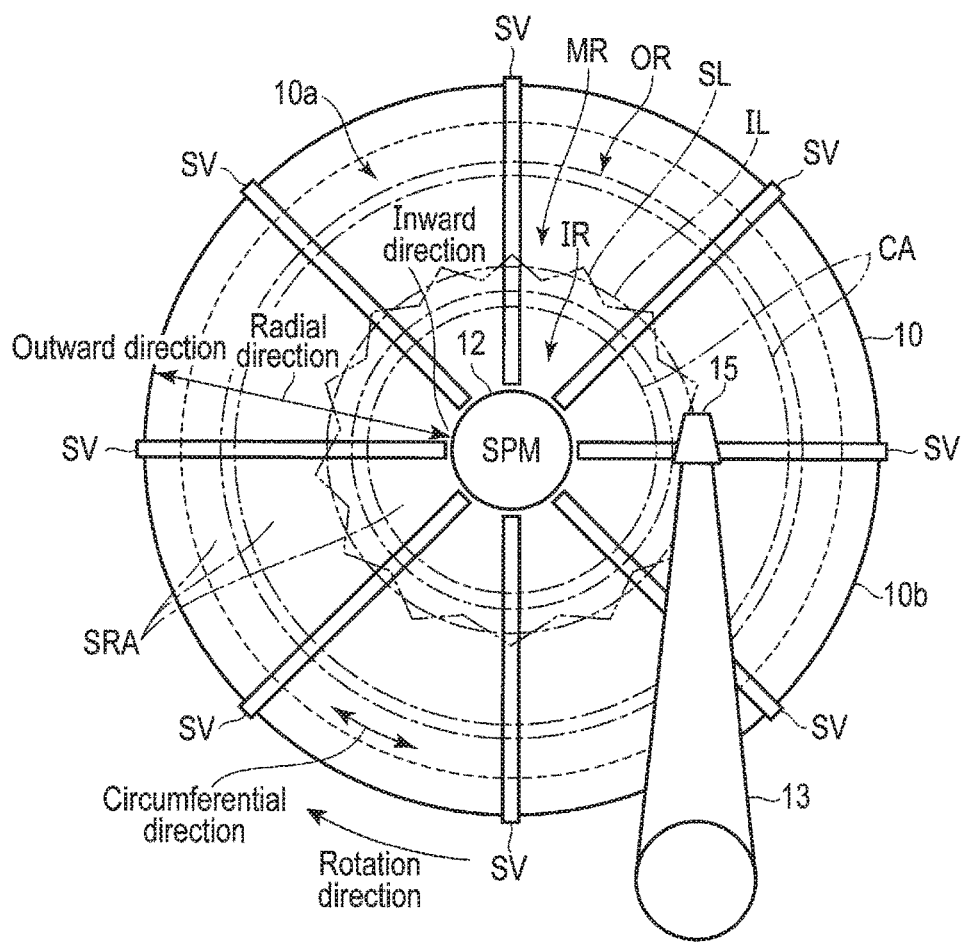
FIG. 2 is a diagram schematically illustrating an example of a trace of a head with respect to the disk according to the first embodiment.

FIG. 2 is a diagram schematically illustrating an example of a trace of the head 15 with respect to the disk 10 according to the first embodiment. In the radial direction of FIG. 2, a direction toward the outer periphery of the disk 10 is called as an outward direction (outward). A direction opposite to the outward direction is called an inward direction (inward). In addition, in FIG. 2, a rotation direction of the disk 10 is illustrated. Further, in FIG. 2, the rotation direction may be reversed. In FIG. 2, the user data region 10*a* is classified into an inner peripheral region IR located in an inward direction, an outer peripheral region OR located in the outward direction, and a middle peripheral region MR located between the inner peripheral region IR and the outer peripheral region OR. The outer peripheral region OR, the inner peripheral region IR, and the middle peripheral region MR each correspond to one of three regions which are obtained by classifying the user data region 10*a* into three parts in the radial direction. For example, the outer peripheral region OR, the inner peripheral region IR, and the middle peripheral region MR each correspond to one of three regions which are obtained by equally dividing the user data region 10*a* into three parts in the radial direction. The middle peripheral region MR includes, for example, a position in the radial direction at which a skew angle of the head 15 becomes 0° (hereinafter, simply referred to as radial position). The skew angle of the head 15 becomes, for example, a positive value in the outward direction from the radial position of 0°, or a negative value in the inward direction from the radial position of 0°. Further, the radial position where the skew angle of the head 15 becomes 0° may be included in the inner peripheral region IR, or may be included in the outer peripheral region OR. In addition, the skew angle of the head 15 becomes a positive value in the inward direction from the radial position of 0°, or may be a negative value in the outward direction from the radial position of 0°. FIG. 2 illustrates a center position (hereinafter, referred to as track center) IL of the width in the radial direction of a particular track of the disk 10 (hereinafter, simply referred as width). The track center IL corresponds to the trace (hereinafter, also referred to as target trace) of the head 15 which is a target in a case where the head 15 is positioned in the particular track. For example, the track center IL is a perfect circle concentric to the disk 10. In addition, FIG. 2 illustrates a trace SL of the head 15 which is deviated with respect to the track center IL due to the repeatable run-out (RRO).

The disk 10 includes a plurality of servo regions SV. Hereinafter, the servo region SV may be called a servo sector. The plurality of servo regions SV radially extends in the radial direction of the disk 10 and is discretely disposed with a particular gap therebetween in the circumferential direction. The servo region SV includes servo data to position the head 15 at a particular radial position of the disk 10.

The shingled magnetic recording region SRA includes the servo data, for example, a preamble (PA), a servo mark, address data, and burst data. The address data is configured by an address (cylinder address) of the particular track and an address of the servo sector of the particular track. The burst data is data (relative position data) used to detect a positional deviation (positional error) in the radial direction of the head 15 with respect to the track center of the particular track, and is configured by a repetition pattern of a particular period. The burst data is written in a staggered manner over the adjacent tracks outside. The burst data includes an error caused by distortion in the track with respect to a track (track center) of the perfect circle which is generated by the repeatable run-out in synchronization of the rotation of the disk 10 when the servo data is written to the disk. Hereinafter, for the convenience of explanation, the error caused by the distortion in the track with respect to the track center which is generated by the RRO is simply called RRO. In the shingled magnetic recording region SRA, a plurality of sectors is disposed between the plurality of servo regions SV. For example, one sector is disposed between two servo regions SV. In the shingled magnetic recording region SRA, the user data is written in each of the plurality of sectors for example. The sector is, for example, a recording region of a smallest unit when the user data is written to the disk 10. As an example, one sector is a 4 Kbyte recording region of the disk 10.

The plurality of correction data regions CA includes the servo data, for example, an RRO preamble pattern (hereinafter, referred to as RRO preamble), and a synchronization pattern. The RRO preamble and the synchronization pattern are used to detect a read start timing of digital data which is obtained by encoding a correction amount written in the next region. In the plurality of correction data regions CA, the plurality of sectors is disposed between the plurality of servo regions SV. A pattern of the RRO correction data to correct the RRO (hereinafter, simply referred to as RRO correction data) is written. In the correction data region CA, the plurality of sectors is disposed between the plurality of servo regions SV. In the correction data region CA, for example, the RRO correction data is written in the plurality of sectors. In one sector, for example, the RRO correction data of 10 tracks can be recorded. As described above, since the RRO correction data is written in the correction data region CA in the same format as the user data, the RRO correction data of all tracks of the disk 10 can be integrally written to the recording region in a particular range in the radial direction. Therefore, it is possible to reduce the RRO preamble. In addition, as described above, since the writing is performed integrally in a particular range in the radial direction, the RRO correction data can be efficiently compressed compared to the discrete writing on the disk 10. In other words, when the RRO correction data is integrally written in a particular range in the radial direction, the capacity of the user data which is writable to the disk 10 can be made large compared to the discrete writing on the disk 10.

The RRO correction data is used to correct the RRO of the servo data (more specifically, servo burst data in the servo data), that is, the distortion in the trace of the head 15 with respect to the track center. The RRO correction may be called a perfect circle correction. The RRO correction data includes digital data (hereinafter, referred to as RRO correction code (RRO Code)) which obtained by encoding the correction amount. At this time, the RRO correction code (RRO Code) forms a main part of the RRO correction data. Such RRO correction data may be called RRObit or Post-Code.

In the example illustrated in FIG. 2, in a case where the head 15 is positioned at the track center IL, the head 15 corrects the operation to pass over the track center IL from the trace SL based on the RRO correction data which is written on the correction data region C.

The driver IC 20 controls the driving of the SPM 12 and the VCM 14 according to the control of the system controller 130 (specifically, MPU 60).

A head amplifier IC (preamplifier) 30 includes a read amplifier and a write driver. The read amplifier amplifies a read signal which is read from the disk 10, and outputs the read signal to the system controller 130 (specifically, a read/write (R/W) channel 50). The write driver outputs a write current according to write data output from the R/W channel 50 to the head 15.

The volatile memory 70 is semiconductor memory of which the stored data is deleted when a power supply is stopped. The volatile memory 70 stores data necessary for the processes of the respective portions of the magnetic disk device 1. The volatile memory 70 is, for example, a DRAM (Dynamic Random Access Memory) or an SDRAM (Synchronous Dynamic Random Access Memory).

The buffer memory 80 is a semiconductor memory which temporally stores data which is received or transmitted between the magnetic disk device 1 and the host 100. Further, the buffer memory 80 may be integrally configured with the volatile memory 70. The buffer memory 80 is, for example, a DRAM, an SRAM (Static Random Access Memory), an SDRAM, a FeRAM (Ferroelectric Random Access memory), or an MRAM (Magnetoresistive Random Access Memory).

The nonvolatile memory 90 is a semiconductor memory of which the stored stores data is recorded even when the power supply is stopped. The nonvolatile memory 90 is, for example, a NOR or NAND flash ROM (Flash Read Only Memory: FROM).

The system controller (controller) 130 is realized using, for example, a large scale integrated circuit (LSI) called a System-on-a-Chip (SoC) in which a plurality of elements is integrated in a single chip. The system controller 130 includes a hard disk controller (HDC) 40, the read/write (R/W) channel 50, and the microprocessor (MPU) 60. The HDC 40, the R/W channel 50, and the MPU 60 are electrically connected to each other. The system controller 130 is electrically connected to, for example, the driver IC 20, the head amplifier IC 30, the volatile memory 70, the buffer memory 80, the nonvolatile memory 90, and the host system 100.

The HDC 40 controls the data transfer between the host 100 and the R/W channel 50 according to an instruction from the MPU 60 described below. The HDC 40 is electrically connected to, for example, the volatile memory 70, the buffer memory 80, and the nonvolatile memory 90.

The R/W channel 50 performs signal processing on read data and write data according to the instruction from the MPU 60. The R/W channel 50 has a circuit or a function of measuring a signal quality of the read data. The R/W channel 50 is electrically connected to, for example, the head amplifier IC 30.

The MPU 60 is a main controller to control the respective parts of the magnetic disk device 1. The MPU 60 controls the VCM 14 through the driver IC 20, and performs a servo control in which the head 15 is positioned. The MPU 60 controls an operation of writing data to the disk 10, and selects a storage destination of the write data which is transferred from the host 100. In addition, the MPU 60 controls an operation of reading data from the disk 10, and controls an operation of processing read data which is transferred from the disk 10 to the host 100. The MPU 60 is connected to the respective parts of the magnetic disk device 1. The MPU 60 is electrically connected to, for example, the driver IC 20, the HDC 40, and the R/W channel 50.

The MPU 60 includes a read/write controller 61, an RRO learning unit 62, an RRO storing unit 63, and a position correcting unit 64. The MPU 60 performs the processes of these units, for example, the read/write controller 61, the RRO learning unit 62, the RRO storing unit 63, and the position correcting unit 64 on firmware. Further, the MPU 60 may include these units as circuit.

The read/write controller 61 controls a read process and a write process of data according to a command from the host 100. The read/write controller 61 controls the VCM 14 through the driver IC 20, positions the head 15 at a particular position on the disk 10, and reads the data from the disk 10 or writes the data to the disk 10.

The RRO learning unit 62 measures a difference between the target trace corresponding to the radial position where the head 15 is positioned and the radial position of the head 15 (the read head 15R) which is recovered from the read servo data (hereinafter, referred to as RRO correction amount), and performs a process of calculating the RRO correction data based on the measured RRO correction amount (hereinafter, also referred to as RRO learning process). The RRO learning process is performed in a test stage or a manufacturing stage of the magnetic disk device 1 for example. Hereinafter, the expressions "to measure the RRO correction amount" and "to calculate the RRO correction data based on the RRO correction amount" are called an RRO learning. The expression "perform the RRO learning" may be called "to measure", "to read", or "to acquired". The RRO correction amount and the RRO correction data may be used in the same meaning. A particular radial position where the RRO learning is performed and a particular radial position where the RRO learning is performed may be called a learning position. In addition, the RRO learning unit 62 may acquire position information in the circumferential direction which is learned by the RRO. Further, the RRO learning unit 62 may perform the RRO learning at some positions in the circumferential direction in a particular radial position, or may perform the RRO learning at all positions in the circumferential direction. In addition, the RRO learning unit 62 may perform the RRO learning in some radial positions, or may perform the RRO in all the radial positions of the disk 10.

The RRO storing unit 63 writes the RRO correction data acquired by the RRO learning in the plurality of correction data regions CA. For example, the RRO storing unit 63 writes the RRO correction data in the plurality of correction data regions CA which is separated in the radial direction. The RRO storing unit 63 may write the acquired RRO correction data in the plurality of correction data regions CA in a normal recording system, or may write the data in a staggered recording manner. Further, the RRO storing unit 63 may store the radial position (for example, address) of the correction data region CA to a memory (for example, the nonvolatile memory 90 and the media cache region 10*b*).

Figure 3:
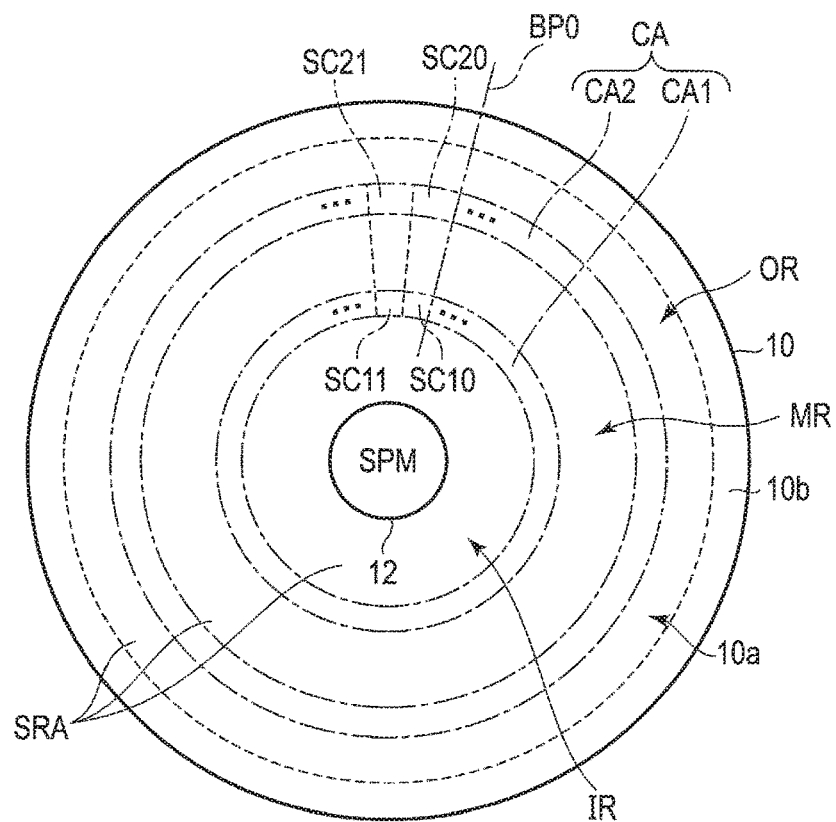
FIG. 3 is a diagram illustrating an example of a method of writing RRO correction data according to the first embodiment.

FIG. 3 is a diagram illustrating an example of a method of writing the RRO correction data according to the first embodiment. In FIG. 3, the user data region 10*a* includes a correction data region CA1 and a correction data region CA2. Further, the user data region 10*a* may include three or more correction data regions CA which are separated from each other in the radial direction. The correction data region CA1 and the correction data region CA2 are separated in the radial direction. The correction data region CA1 and the correction data region CA2 are positioned in the middle peripheral region MR for example. The correction data region CA1 includes a sector SC10 and a sector SC11. The correction data region CA2 includes a sector SC20 and a sector SC21. The sector SC10 and the sector SC20 are arranged almost in a line in the radial direction. The sector SC11 and the sector SC21 are arranged almost in a line in the radial direction. In FIG. 3, the servo region SV is omitted for the convenience of drawing.

The RRO storing unit 63 writes the RRO correction data acquired by the RRO learning in the correction data regions CA1 and CA2. The RRO storing unit 63 writes the same RRO correction data in the correction data regions CA1 and CA2. For example, the RRO storing unit 63 writes the same RRO correction data to the plurality of recording regions of each of the plurality of correction data regions CA arranged in the radial direction (for example, sectors). In the example illustrated in FIG. 3, the RRO storing unit 63 writes the RRO correction data to the correction data region CA1 in an order of the sectors SC10, SC11, and so on from a particular position (hereinafter, referred to as reference position) BP0 in the circumferential direction. The RRO storing unit 63 writes the RRO correction data in an order of the sectors SC20, SC21, and so on from the reference position BP0 in the correction data region CA2. The RRO storing unit 63 writes the same RRO correction data in the sector SC10 and the sector SC20, and writes the same RRO correction data in the sector SC11 and the sector SC21. The RRO storing unit 63 writes the same plurality of pieces of RRO correction data as the plurality of pieces of RRO correction data continuously written in the circumferential direction of the sector SC11 in the correction data region CA1 to the plurality of sectors which is continuously arranged in the circumferential direction of a sector ASC21 of the correction data region CA2 in the same order.

The position correcting unit 64 reads the RRO correction data from the correction data region CA, calculates the RRO correction amount based on the read RRO correction data, and corrects the position of the head based on the calculated RRO correction amount and an offset amount from the track center of the track corresponding to the read RRO correction data. In a case where the write process and the read process (hereinafter, also referred to as access process) is performed in a particular band region (hereinafter, referred to as target band region) of the shingled magnetic recording region SRA, the position correcting unit 64 reads the RRO correction data (hereinafter, referred to as target RRO correction data) corresponding to the target band region from the correction data region CA, and performs the access process on the target band region based on the target RRO correction data. Herein, the expression "access" is used as a terminology containing both meanings of "to write data to the disk 10" and "to read data from the disk 10". In the example illustrated in FIG. 3, in a case where the access process is performed on the target band region, the position correcting unit 64 reads the target RRO correction data from the region closest to the current position of the head 15 where the reading is easy to be performed in the correction data region CA1 and the correction data region CA2. Further, in a case where the plurality of correction data regions CA closest to the current position of the head 15 is detected, the MPU 60 reads the target RRO correction data from one correction data region CA in the plurality of correction data regions CA closest to the current position of the head 15 based on a particular selection standard. In addition, in a case where the target RRO correction data is not possible to be read in one of the correction data region CA1 and the correction data region CA2, the position correcting unit 64 reads the target RRO correction data of the other one of the correction data regions CA1 and CA2.

Figure 4:
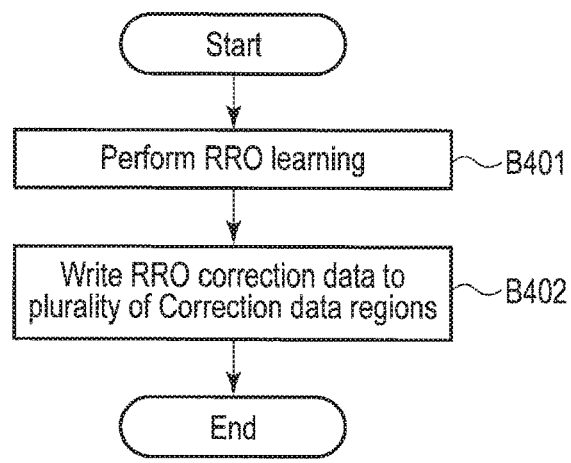
FIG. 4 is a flowchart illustrating an example of the method of writing the RRO correction data according to the first embodiment.

FIG. 4 is a flowchart illustrating an example of a method of writing the RRO correction data according to the first embodiment.

The MPU 60 performs the RRO learning at each radial position of the disk 10 (B401), writes the RRO correction data acquired in the RRO learning to the plurality of correction data regions CA separated in the radial direction (B402), and ends the process. For example, the MPU 60 writes the acquired RRO correction data from the reference position BP0 to the correction data region CA1, and writes the same RRO correction data as the RRO correction data written to the correction data region CA1 from the reference position BP0 to the correction data region CA2 which is separated in the radial direction from the correction data region CA1.

FIG. 5 is a flowchart illustrating an example of the access process of the first embodiment.

In a case where the access process is performed on the target band region, the MPU 60 accesses to the correction data region CA (B501). For example, the MPU 60 accesses to the correction data region CA closest to the current position of the head 15 in the plurality of correction data regions CA (or to seek the head 15). The MPU 60 reads the target RRO correction data from the accessed correction data region CA (B502), and determines whether the target RRO correction data is readable or not (B503). In a case where it is determined that the target RRO correction data is readable (YES of B503), the MPU 60 proceeds to the process of B508. In a case where it is determined that the target RRO correction data is not readable (NO of B503), the MPU 60 accesses to the correction data region CA other than the correction data region CA which is determined as not readable (B504). The MPU 60 reads the target RRO correction data from the accessed other correction data region CA (B505), and determines whether the target RRO correction data is readable or not (B506). In a case where it is determined that the target RRO correction data is not readable (NO of B506), the MPU 60 determines that there is a correction data region CA other than the correction data region CA which is determined as not readable (B507). In a case where it is determined that there is another correction data region CA (YES of B507), the MPU 60 proceeds to the process of B504. In a case where it is determined that there is no other correction data region CA (NO of B507), the MPU 60 sets an error. In a case where it is determined that the target RRO correction data is not readable (YES of B506), the MPU 60 performs the access process on the target band region (B508), and ends the process.

According to this embodiment, the magnetic disk device 1 writes the same RRO correction data in the plurality of correction data regions CA separated in the radial direction in the same format as the user data. In a case where the access process is performed on the target band region, the magnetic disk device 1 reads the RRO correction data from the correction data region CA closest to the current radial position of the head 15. In addition, in a case where the target RRO correction data is not readable from one correction data region CA in the plurality of correction data regions CA, the magnetic disk device 1 reads the target RRO correction data from another correction data region CA in the plurality of correction data regions CA. Since the RRO preamble is not necessarily written to each servo sector, the magnetic disk device 1 can efficiently write the RRO correction data to the disk. Since it is possible to access to one correction data region CA closest to the current radial position of the head 15 in the plurality of correction data regions CA, the magnetic disk device 1 can improve a performance of reading the RRO correction data. In addition, in a case where a process of accessing (reading/writing) to the target band region is performed, the magnetic disk device 1 can securely read the RRO correction data. Therefore, it is possible to provide the magnetic disk device 1 which can improve a positioning accuracy.

Next, the magnetic disk device according to a modification and another embodiment will be described. In the modification and the other embodiments, the same portions as those of the above embodiment will be attached with the same symbols, and the description thereof will be omitted.

Second Embodiment

A magnetic disk device 1 of a second embodiment is different from the above embodiment in that there is provided a disk 10 which further includes a replaceable region AA.

A user data region 10a further includes a plurality of replaceable regions AA for example. The plurality of replaceable regions AA is adjacent to the vicinity of a plurality of correction data regions CA (for example, near in the radial direction).

In a case where a read error occurs in the correction data region (hereinafter, referred to as error data region) CA, an RRO storing unit 63 reads RRO correction data of a correction data region CA other than the error data region CA, and writes the read RRO correction data in the vicinity of the error data region CA (for example, the replaceable region AA adjacent to the radial direction). For example, in a case where the read error occurs in the target RRO correction data of the error data region CA, the RRO storing unit 63 reads the target RRO correction data from a correction data region CA other than the error data region CA, and writes the read target RRO correction data to the replaceable region AA adjacent to the radial direction of the error data region CA. In a case where the read error occurs in the error data region CA, the RRO storing unit 63 reads the RRO correction data from a correction data region CA other than the error data region CA, and writes, in each recording region of the correction data region CA and the replaceable region AA arranged in the radial direction, for example, a sector, the same PRO correction data as the RRO correction data which is written in the error data region CA. Further, the RRO storing unit 63 may write the target RRO correction data to the replaceable region AA in a normal recording method, or may write the target RRO correction data in a staggered recording method. Further, the RRO storing unit 63 stores the radial position (for example, address) of the replaceable region AA in a memory (for example, a nonvolatile memory 90 and a media cache region 10b).

Figure 6:
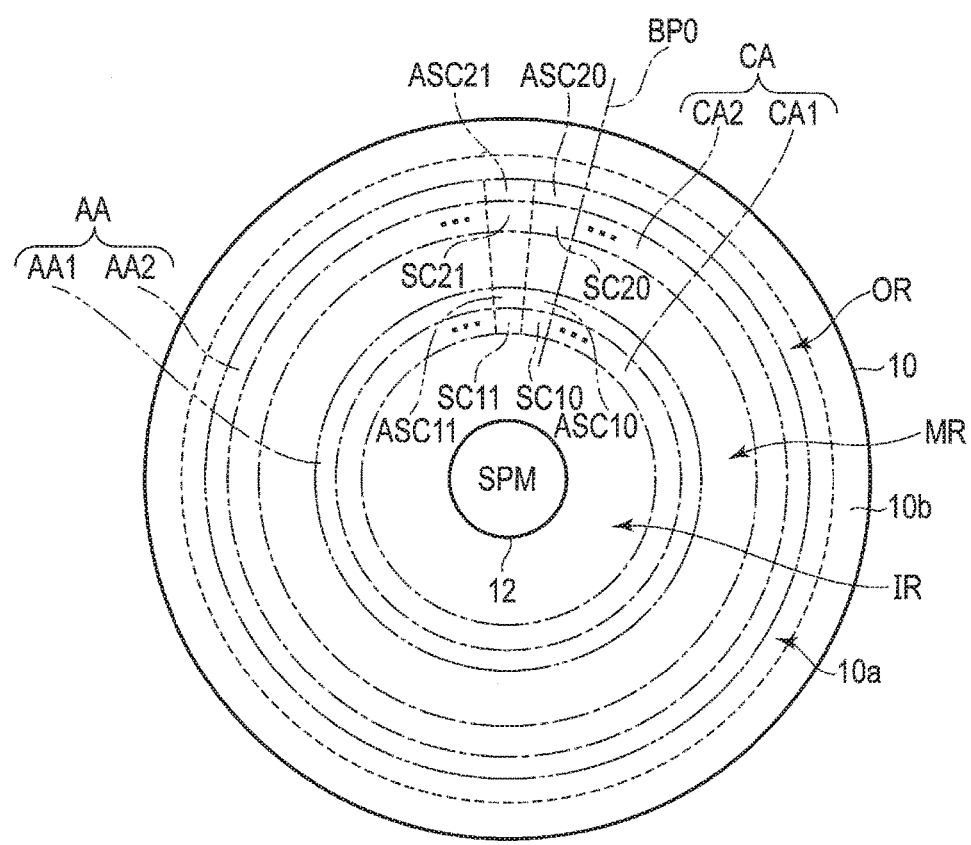
FIG. 6 is a diagram illustrating an example of a method of writing RRO correction data according to a second embodiment.

FIG. 6 is a diagram illustrating an example of a method of writing the RRO correction data according to the second embodiment. In FIG. 6, the user data region 10a includes a replaceable region AA1 and a replaceable region AA2. Further, in a case where the user data region 10a includes three or more correction data regions CA separated from each other in the radial direction, the plurality of replaceable regions AA each corresponding to three or more correction data regions CA may be included. The replaceable region AA1 is adjacent to a correction data region CA1 in the outward direction in the radial direction. The replaceable region AA2 is adjacent to a correction data region CA2 in the outward direction in the radial direction. Further, the replaceable region AA1 may be adjacent to the correction data region CA1 in the inward direction in the radial direction. The replaceable region AA2 may be adjacent to the correction data region CA2 in the inward direction in the radial direction. In addition, the replaceable region AA1 may be separated in the radial direction of the correction data region CA1. The replaceable region AA2 may be separated in the radial direction of the correction data region CA2. The replaceable region AA1 includes a sector ASC10 and a sector ASC11. The replaceable region AA2 includes a sector ASC20 and a sector ASC21. The sector SC10, the sector ASC10, the sector SC20, and the sector ASC20 are arranged almost in a line in the radial direction. The sector SC11, the sector ASC11, the sector SC21, and the sector ASC21 are arranged almost in a line in the radial direction. In FIG. 6, the servo region SV is omitted for the convenience of drawing.

In a case where the read error occurs in the target RRO correction data of an error data region CA1, the RRO storing unit 63 reads the correction data region CA2, and writes the RRO correction data containing the read target RRO correction data to the replaceable region AA1. For example, in a case where the read error occurs in the sector SC10 where the target RRO correction data of the error data region CA1 is written, the RRO storing unit 63 reads the RRO correction data as much as a particular range containing the target RRO correction data of the correction data region CA2, and writes the RRO correction data as much as the read particular range to the replaceable region AA1. In addition, in a case where the read error occurs in the target RRO correction data of an error data region CA2, the RRO storing unit 63 reads the correction data region CA1, and writes the RRO correction data containing the read target RRO correction data to the replaceable region AA2. For example, in a case where the read error occurs in the sector SC20 where the target RRO correction data of the error data region CA2 is written, the RRO storing unit 63 reads the RRO correction data as much as a particular range containing the target RRO correction data of the correction data region CA1, and writes the RRO correction data as much as the read particular range to the replaceable region AA2. Further, in a case where the read error occurs in the sector SC10 where the target RRO correction data of the error data region CA1 is written, the RRO storing unit 63 may read the target RRO correction data from the sector SC20 of the correction data region CA2, and write the read target RRO correction data to the sector ASC10 of the replaceable region AA1. In addition, in a case where the read error occurs in the sector SC20 where the target RRO correction data of the error data region CA2 is written, the RRO storing unit 63 may read the target RRO correction data from the sector SC10 of the correction data region CA1, and write the read target RRO correction data to the sector ASC20 of the replaceable region AA2.

In the example illustrated in FIG. 6, in a case where the read error occurs in the target RRO correction data of the error data region CA1, the RRO storing unit 63 writes the RRO correction data to the replaceable region AA1 in an order of the sectors ASC10, ASC11, and so on from the reference position BP0. The RRO storing unit 63 writes the same RRO correction data as that in the sectors SC10 and SC20 to the sector ASC10, and writes the same RRO correction data as that in the sectors SC11 and SC21 to the sector ASC11. The RRO storing unit 63 writes the plurality of pieces of the same RRO correction data as the plurality of pieces of the RRO correction data which is written continuous in the circumferential direction of the sector SC11 (and the sector SC21 in the correction data region CA2) in the correction data region CA1 to the plurality of sectors which is arranged continuous in the circumferential direction of the sector ASC11 of the replaceable region AA1 in the same order. In addition, the RRO storing unit 63 writes the plurality of pieces of the RRO correction data as the plurality of pieces of the RRO correction data which is written continuous in the circumferential direction of the sector SC21 (and the sector SC11 in the correction data region CA1) in the correction data region CA2 to the plurality of sectors which is arranged continuous in the circumferential direction of the sector ASC21 of the replaceable region AA2 in the same order.

In a case where the read error occurs in the error data region CA, a position correcting unit 64 reads the target RRO correction data from the correction data region CA other than the error data region CA or from the replaceable region AA, and performs an access process on the target band region based on the target RRO correction data. In the example illustrated in FIG. 6, in a case where the read error occurs in the error data region CA1, the position correcting unit 64 easily accesses the replaceable region AA1 and the correction data region CA2 and, for example, reads the target RRO correction data from the region closest to the current position of the head 15. Further, in a case where the read error occurs in the sector SC10 of the error data region CA1, the position correcting unit 64 may read the target RRO correction data from the region closest to the current position of the head 15 in the sector ASC10 of the replaceable region AA1 and the sector SC20 of the correction data region CA2 only when the sector SC10 is read.

Figure 7:
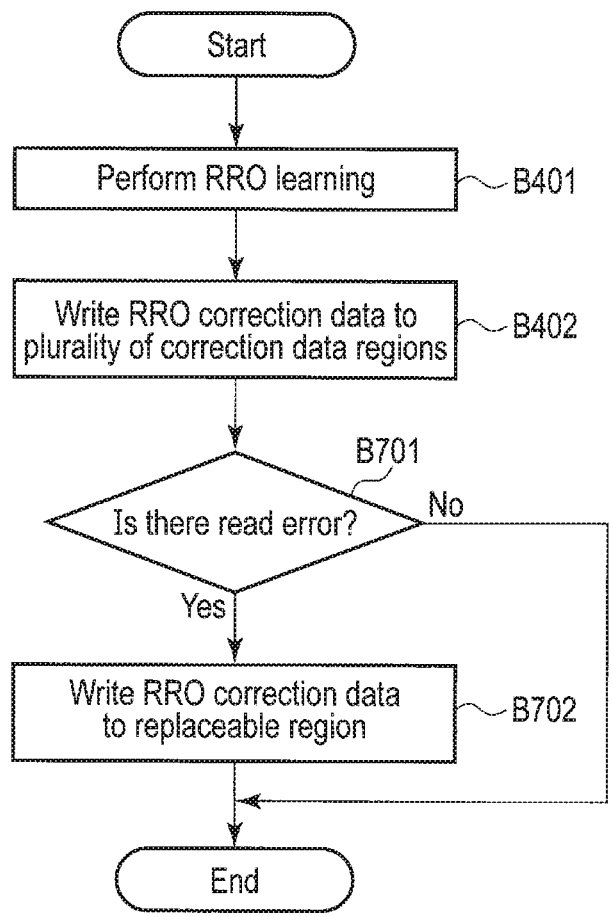
FIG. 7 is a flowchart illustrating an example of the method of writing the RRO correction data according to the second embodiment.

FIG. 7 is a flowchart illustrating an example of a method of writing the RRO correction data according to the second embodiment.

The MPU 60 performs the RRO learning at each radial position of the disk 10 (B401), writes the RRO correction data acquired from the RRO learning to the plurality of correction data regions CA separated in the radial direction (B402), and determines whether the read error occurs in the correction data region CA (B701). In a case where it is determined that the read error does not occur (NO of B701), the MPU 60 ends the process. In a case where it is determined that the read error occurs (YES of B701), the MPU 60 reads the RRO correction data containing the target RRO correction data from the correction data region CA other than the error data region CA, writes the RRO correction data containing the read target RRO correction data to the replaceable region AA adjacent in the radial direction of the error data region CA (B702), and ends the process.

Figure 8:
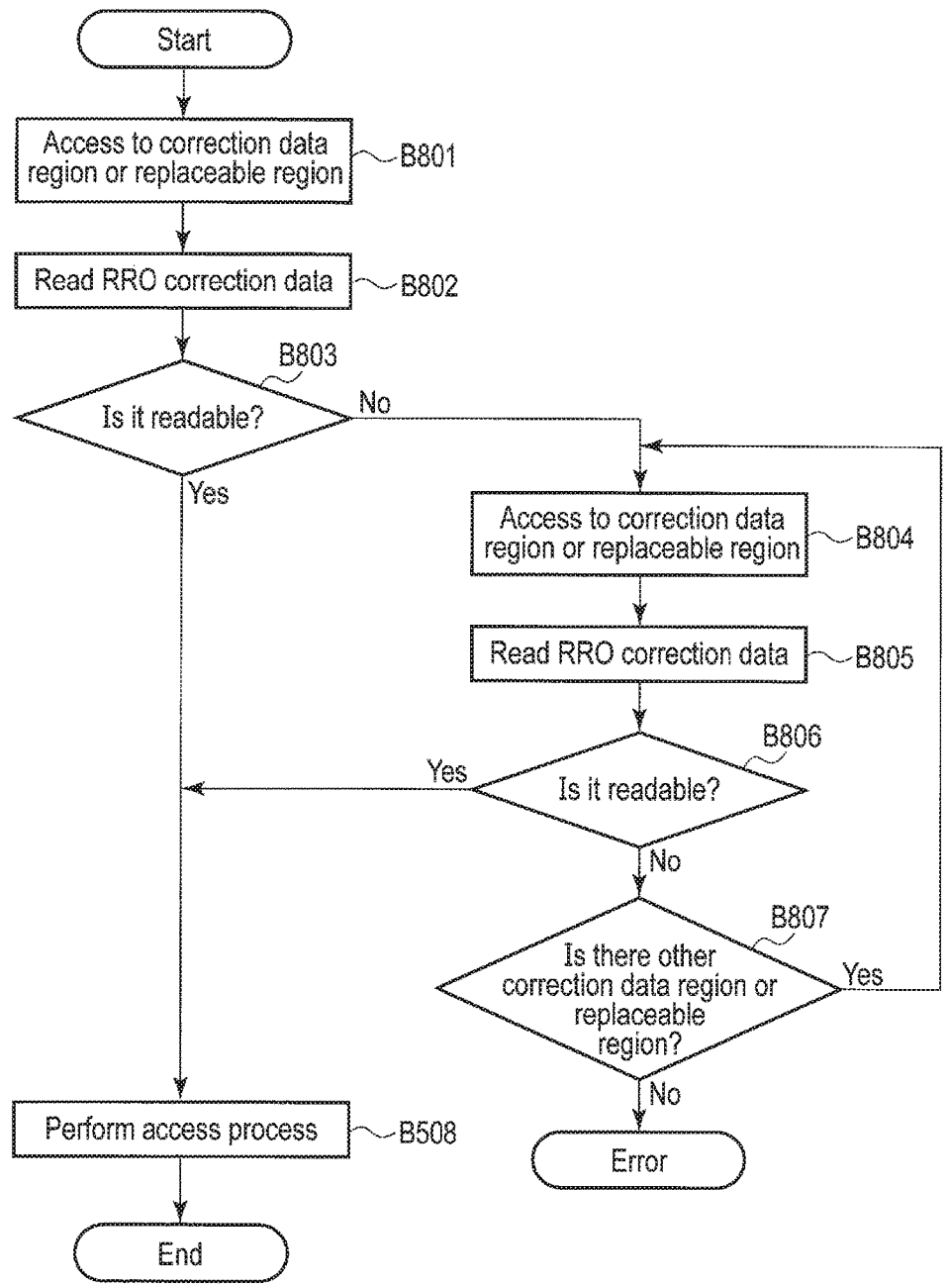
FIG. 8 is a flowchart illustrating an example of an access process of the second embodiment.

FIG. 8 is a flowchart illustrating an example of the access process of the second embodiment.

In a case where the access process is performed on the target band region, the MPU 60 accesses to the correction data region CA or the replaceable region AA (B801). For example, the MPU 60 accesses to the correction data region CA or the replaceable region AA closest to the current position of the head 15 in the plurality of correction data regions CA or the replaceable region AA. Further, in a case where the plurality of correction data regions CA and the plurality of replaceable regions AA closest to the current position of the head 15 are detected, the MPU 60 accesses to one correction data region CA or one replaceable region in the plurality of correction data regions CA and the replaceable region AA closest to the current position of the head 15 based on a particular selection standard. The MPU 60 reads the target RRO correction data from the accessed correction data region CA or the replaceable region AA (B802), and determines whether the target RRO correction data is readable or not (B803). In a case where it is determined that the target RRO correction data is readable (YES of B803), the MPU 60 proceeds to the process of B508. In a case where it is determined that the target RRO correction data is not readable (NO of B803), the MPU 60 accesses to a correction data region CA or a replaceable region AA other than the correction data region CA which is determined as not readable (B804). The MPU 60 reads the target RRO correction data from the accessed correction data region CA or the accessed replaceable region AA (B805), and determines whether the target RRO correction data is readable or not (B806). In a case where it is determined that the target RRO correction data is not readable (NO of B806), the MPU 60 determines whether there is a correction data region CA or a replaceable region AA other than the correction data region CA or the replaceable region AA which are determined as not readable (B807). In a case where it is determined there is the other correction data region CA or the other replaceable region AA (YES of B807), the MPU 60 proceeds to the process of B804. It is determined that there is no other correction data region CA or no other replaceable region AA (NO of B807), the MPU 60 issues an error. In a case where it is determined that the target RRO correction data is readable (YES of B806), the MPU 60 performs the access process on the target band region (B508), and ends the process.

According to the second embodiment, the magnetic disk device 1 is provided with the disk 10 which includes the replaceable region AA. In a case where the read error occurs in the correction data region CA, the magnetic disk device 1 reads the RRO correction data from a correction data region CA other than the error data region CA, and writes the read RRO correction data to the replaceable region AA adjacent in the radial direction of the error data region CA. Therefore, in a case where the access process is performed on the target band region, the magnetic disk device 1 can securely read the RRO correction data. In other words, the positioning accuracy of the magnetic disk device 1 is improved.

(First Modification)

A magnetic disk device 1 of a first modification is different from the above-mentioned embodiments in that there is provided a disk 10 in which the correction data region CA and the replaceable region AA are separated in the radial direction.

In a case where the read error occurs in an error data region CA, an RRO storing unit 63 reads the RRO correction data of a correction data region CA other than the error data region CA, and writes the read RRO correction data to the replaceable region AA near (that is, separated in the radial direction for example) the error data region CA.

Figure 9:
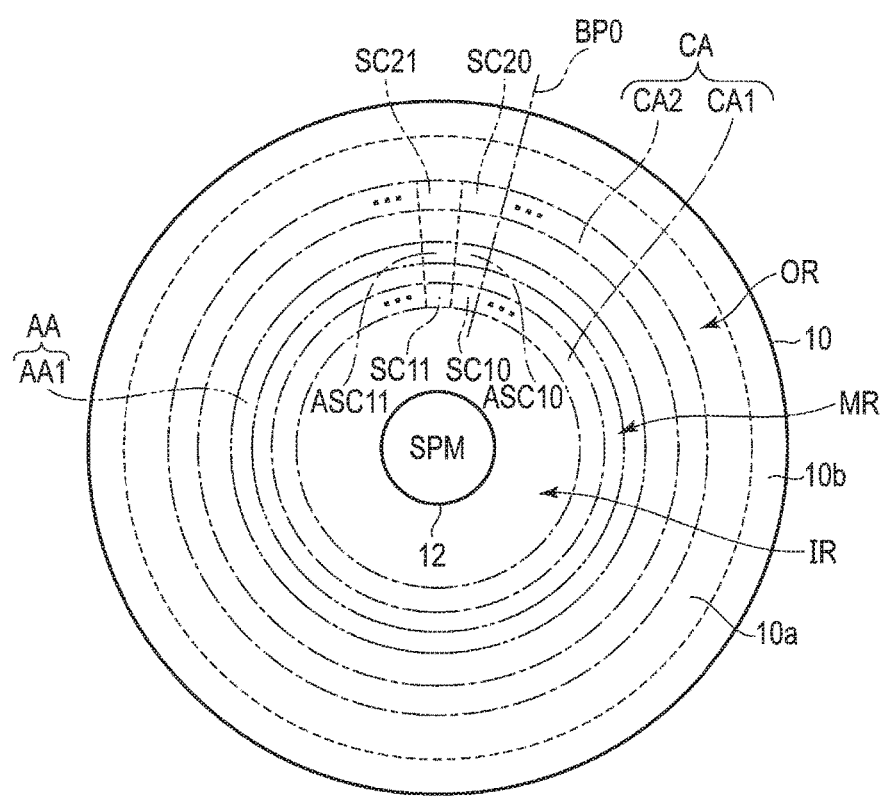
FIG. 9 is a diagram illustrating an example of a method of writing RRO correction data according to a first modification.

FIG. 9 is a diagram illustrating an example of a method of writing the RRO correction data according to the first modification. In FIG. 9, a user data region 10*a* includes a replaceable region AA1. The replaceable region AA1 is separated in the outward direction of the radial direction of a correction data region CA1, and separated in the inward direction of the radial direction of a correction data region CA2. Further, the replaceable region AA1 may be separated in the inward direction of the radial direction of the correction data region CA1. In addition, the replaceable region AA1 may be separated in the outward direction of the radial direction of the correction data region CA2. The replaceable region AA1 is located in the middle peripheral region MR for example. In FIG. 9, the servo region SV is omitted for the convenience of drawing.

In a case where the read error occurs in the target RRO correction data of an error data region CA1, the RRO storing unit 63 reads the RRO correction data containing the target RRO correction data from the correction data region CA2, and writes the read target RRO correction data to the replaceable region AA1. In addition, in a case where the read error occurs in the target RRO correction data of an error data region CA2, the RRO storing unit 63 reads the RRO correction data containing the target RRO correction data from the correction data region CA1, and writes the read target RRO correction data to the replaceable region AA1.

According to the first modification, the magnetic disk device 1 includes the disk 10 in which the correction data region CA and the replaceable region AA are separated in the radial direction. Therefore, the magnetic disk device 1 can achieve an improved access performance to the replaceable region AA.

(Second Modification)

A magnetic disk device 1 of a second modification is different from the above-mentioned modification and the embodiments in that there is provided a disk 10 which includes the plurality of correction data regions CA where the RRO correction data is deviated from each other in the circumferential direction.

An RRO storing unit 63 writes the acquired RRO correction data to the plurality of correction data regions CA to be deviated in the circumferential direction by the RRO learning. Further, in a case where the read error occurs in an error data region CA, the RRO storing unit 63 may read the RRO correction data of a correction data region CA other than the error data region CA, and write the read RRO correction data to a replaceable region AA adjacent in the radial direction of the error data region CA to be deviated in the circumferential direction with respect to the error data region CA.

Figure 10:
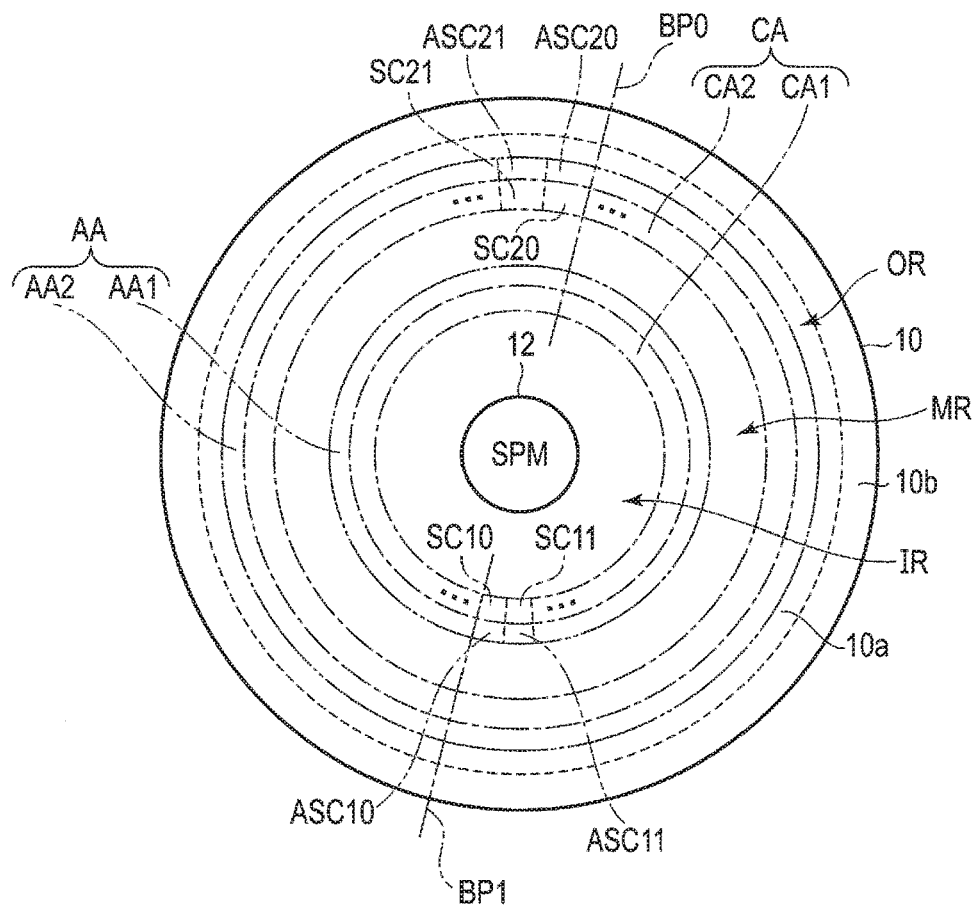
FIG. 10 is a diagram illustrating an example of a method of writing RRO correction data according to a second modification.

FIG. 10 is a diagram illustrating an example of a method of writing the RRO correction data according to the second modification. In FIG. 10, the reference position BP0 and the reference position BP1 are deviated in the circumferential direction. For example, the reference position BP0 and the reference position BP1 are deviated by a half cycle of the disk 10 in the circumferential direction. Therefore, a sector SC10 and a sector SC11, and a sector SC20 and a sector SC21 are deviated in the circumferential direction. A sector ASC10 and a sector ASC11, and a sector ASC20 and a sector ASC21 are deviated in the circumferential direction. The sector SC10 and the sector ASC10 are arranged in the radial direction, and the sector SC11 and the sector ASC11 are arranged in the radial direction. In addition, the sector SC20 and the sector ASC20 are arranged in the radial direction, and the sector SC21 and the sector ASC21 are arranged in the radial direction. Further, the sector SC10 and the sector ASC10 may be deviated in the circumferential direction, and the sector SC11 and the sector ASC11 may be deviated in the circumferential direction. In addition, the sector SC20 and the sector ASC20 may be deviated in the circumferential direction, and the sector SC21 and the sector ASC21 may be deviated in the circumferential direction. In FIG. 10, the servo region SV is omitted for the convenience of drawing.

In the example illustrated in FIG. 10, the RRO storing unit 63 writes the RRO correction data to the correction data region CA1 in an order of the sectors SC10, SC11, and so on from the reference position BP1. The RRO storing unit 63 writes the RRO correction data to the correction data region CA2 in an order of the sectors SC20, SC21, and so on from the reference position BP0. The RRO storing unit 63 writes the same RRO correction data to the sectors SC10 and SC20, and writes the same RRO correction data to the sector SC11 and the sector SC21.

In the example illustrated in FIG. 10, in a case where the read error occurs in the target RRO correction data of an error data region CA1, the RRO storing unit 63 reads the correction data region CA2, and writes the RRO correction data containing the read target RRO correction data to a replaceable region AA1 in on order of the sectors ASC10, ASC11, and so on from the reference position BP1 in the circumferential direction. The RRO storing unit 63 writes the same RRO correction data to the sectors SC10 and ASC10, and writes the same RRO correction data to the sectors SC11 and ASC11. The RRO storing unit 63 writes the plurality of pieces of the same RRO correction data as the plurality of pieces of the RRO correction data which is written continuous in the circumferential direction of the sector SC21 in the correction data region CA2 to the plurality of sectors which is arranged continuous in the circumferential direction of the sector ASC11 of the replaceable region AA1 in the same order. Further, in a case where the read error occurs in the error data region CA, the RRO storing unit 63 may read the RRO correction data from a correction data region CA other than the error data region CA, and write the read RRO correction data to the replaceable region AA adjacent in the radial direction of the error data region CA to be deviated in the circumferential direction with respect to the error data region CA.

Figure 11:
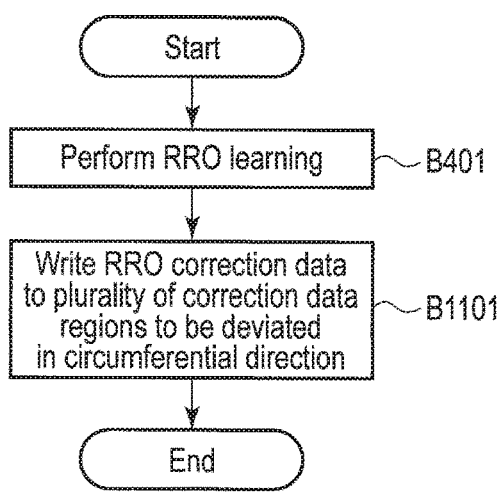
FIG. 11 is a flowchart illustrating an example of the method of writing the RRO correction data according to the second modification.

FIG. 11 is a flowchart illustrating an example of the method of writing the RRO correction data according to the second modification.

The MPU 60 performs the RRO learning at each radial position of the disk 10 (B401), writes the acquired RRO correction data acquired in the RRO learning to the plurality of correction data regions CA to be deviated in the circumferential direction (B1101), and ends the process. For example, the MPU 60 writes the acquired RRO correction data from the reference position BP1 to the correction data region CA1, and writes the same RRO correction data as the RRO correction data written to the correction data region CA1 from the reference position BP0 to the correction data region CA2 which is separated in the radial direction from the correction data region CA1.

According to the second modification, the magnetic disk device 1 is provided with the disk 10 which includes the plurality of correction data regions CA where the RRO correction data is deviated from each other in the circumferential direction. Therefore, the magnetic disk device 1 can achieve an improved access performance to the target RRO correction data.

Further, the configurations of the above-mentioned embodiments and modifications can be applied not only to the magnetic disk device 1 of a shingled magnetic recording system but even to the magnetic disk device 1 of a normal recording system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk which includes a plurality of servo sectors radially extending in a radial direction and being discretely disposed with a gap in a circumferential direction;
   a head which writes data to the disk and reads data from the disk; and
   a controller which writes a plurality of pieces of correction data with respect to a repeatable run-out of the disk to a plurality of first sectors disposed between the servo sectors in a first region, and writes the pieces of correction data to a plurality of second sectors disposed between the servo sectors in a second region different from the first region.

2. The magnetic disk device according to claim 1,
   wherein the second region is separated in the radial direction from the first region.

3. The magnetic disk device according to claim 1,
   wherein the controller writes the pieces of correction data from a third sector in the first sectors, and writes the pieces of correction data from the third sector and a fourth sector in the second sectors which are arranged in the radial direction.

4. The magnetic disk device according to claim 1,
   wherein the controller writes the pieces of correction data from a third sector in the first sectors, and writes the pieces of correction data from a fourth sector in the second sectors which are deviated in the circumferential direction with respect to the third sector.

5. The magnetic disk device according to claim 1,
   wherein, in a case where a read error occurs in the second region, the controller writes the pieces of correction data read from the first region to a third region which is located in the radial direction of the second region.

6. The magnetic disk device according to claim 5,
   wherein the third region is adjacent to the second region.

7. The magnetic disk device according to claim 5,
   wherein the third region is separated from the second region.

8. The magnetic disk device according to claim 1,
   wherein the controller overwrites a second track on part of a first track in a fourth region which is different from the first region and the second region.

9. The magnetic disk device according to claim 1,
   wherein the controller reads first correction data from the second region in a case where the first correction data in the pieces of correction data is not readable in the first region.

10. A magnetic disk device comprising:
    a disk which includes a plurality of servo sectors radially extending in a radial direction and being discretely disposed with a gap in a circumferential direction, a first region comprising a plurality of pieces of correction data with respect to a repeatable run-out which are written in a plurality of first sectors, each of which is disposed between the servo sectors, and a second region comprising the pieces of correction data which are written in a plurality of second sectors, each of which is disposed between the servo sectors;
    a head which writes data to the disk and reads data from the disk; and
    a controller which controls a position of the head based on the pieces of correction data.

11. The magnetic disk device according to claim 10,
    wherein the second region is separated in the radial direction from the first region.

12. A method of writing RRO correction data applied to a magnetic disk device, the magnetic disk device comprising a disk which includes a plurality of servo sectors radically extending in a radial direction and being discretely disposed with a gap in a circumferential direction, and a head which writes data to the disk and reads data from the disk, the method comprising:
    writing a plurality of pieces of correction data with respect to a repeatable run-out of the disk to a plurality of first sectors disposed between the servo sectors in a first region; and
    writing the pieces of correction data to a plurality of second sectors disposed between the servo sectors in a second region which is different from the first region.

13. The method of writing the RRO correction data according to claim 12,
    wherein the second region is separated in the radial direction from the first region.

14. The method of writing the RRO correction data according to claim 12, further comprising:
    writing the pieces of correction data from a third sector in the first sectors; and
    writing the pieces of correction data from the third sector and a fourth sector in the second sectors which are arranged in the radial direction.

15. The method of writing the RRO correction data according to claim 12, further comprising:
    writing the pieces of correction data from a third sector in the first sectors; and
    writing the pieces of correction data from a fourth sector in the second sectors which are deviated in the circumferential direction with respect to the third sector.

16. The method of writing the RRO correction data according to claim 12, further comprising:
    in a case where a read error occurs in the second region, writing the pieces of correction data read from the first region to a third region which is located in the radial direction of the second region.

17. The method of writing the RRO correction data according to claim 16,
    wherein the third region is adjacent to the second region.

18. The method of writing the RRO correction data according to claim 16,
    wherein the third region is separated from the second region.

19. The method of writing the RRO correction data according to claim 12, further comprising:
  overwriting a second track on part of a first track in a fourth region which is different from the first region and the second region.

20. The method of writing the RRO correction data according to claim 12, further comprising:
  reading first correction data from the second region in a case where the first correction data in the pieces of correction data is not readable in the first region.

* * * * *